United States Patent [19]

Leahy et al.

[11] Patent Number: 4,956,644

[45] Date of Patent: Sep. 11, 1990

[54] CHANNELIZED BINARY-LEVEL RADIOMETER

[75] Inventors: Ronald S. Leahy; Patrick J. Smith, both of Salt Lake City, Utah; Scott R. Bullock, Cos, Colo.

[73] Assignee: Unisys Corporation, Blue Bell, Pa.

[21] Appl. No.: 417,124

[22] Filed: Oct. 4, 1989

[51] Int. Cl.$^5$ .................................................. G01S 3/02
[52] U.S. Cl. ........................................ 342/351; 375/1; 342/20; 340/600; 324/77 E
[58] Field of Search ................. 375/1; 342/13, 14, 16, 342/20, 351; 343/703; 324/77 B, 77 C, 77 E; 340/600; 455/228

[56] References Cited

U.S. PATENT DOCUMENTS

| | | | |
|---|---|---|---|
| 2,862,204 | 11/1958 | Henrici et al. | 342/20 X |
| 3,210,762 | 10/1965 | Brabant | 342/13 X |
| 3,215,934 | 11/1965 | Sallen | 342/13 X |
| 3,660,844 | 5/1972 | Potter | 342/20 |
| 3,922,676 | 11/1975 | O'Berry et al. | 342/13 |
| 4,079,380 | 3/1978 | Esry et al. | 375/1 X |
| 4,860,013 | 8/1989 | Huntley | 342/20 |
| 4,864,309 | 9/1989 | Wiley et al. | 342/351 |

Primary Examiner—Thomas H. Tarcza
Assistant Examiner—Bernarr Earl Gregory
Attorney, Agent, or Firm—Alfred W. Kozak; Robert S. Bramson

[57] ABSTRACT

A signal detector for receiving a wide band (W) of frequency-hopped signals which channelizes the incoming signals, via filter banks into a plurality (L) of channels. Magnitude squaring circuits in each channel generate a "power" estimate which is compared to a preset threshold value by threshold-quantizer units that produce a positive voltage (=1) if the threshold is exceeded. After summation of all the channels, the direct sequence (DS) signal component and noise component are processed so that a DC voltage is produced if a frequency-hop signal (FH) is present which is greater in value than when the signal is not present. Thus the DC signal indicates whether the FH signal is present or absent.

11 Claims, 2 Drawing Sheets

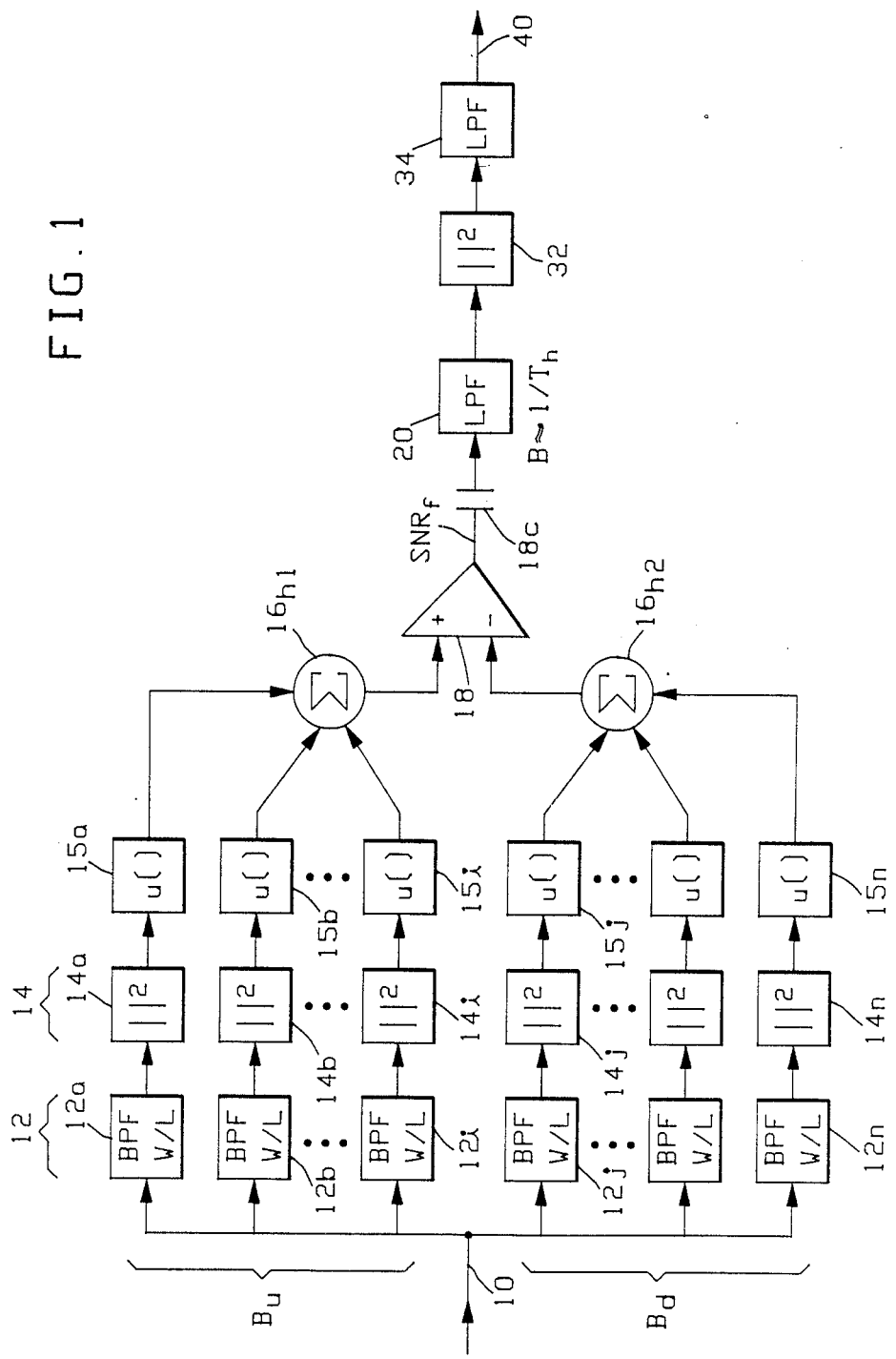

CHANNELIZED BINARY-LEVEL RADIOMETER

FIELD OF THE INVENTION

This disclosure relates to the field of receptivity to modulated or unmodulated frequency hopped signals in regard to detecting the presence of an information signal.

CROSS REFERENCES TO RELATED APPLICATIONS

This application is related to a co-pending application entitled "Channelized Binary Level Hop Rate Detector, having the same filing date as the instant application, the co-pending application being filed Oct. 4, 1989 as U.S. Ser. No. 417,175 by inventors Ronald Leahy, Patrick Smith and Scott Bullock, and said co-pending application is included herein by reference.

BACKGROUND OF THE INVENTION

In recent years, the use of frequency hopped nets have been developed to provide for secure and reliable digital communication systems. It has been noted that frequency hopped nets are able to maintain intelligible communication with as much as 20 percent of their channels jammed, and for this reason, it has been possible to operate frequency hopped (FH) net transmissions in very cluttered spectral regions.

Since the frequency hopped rates tend to be generally in a fairly low, sweeping level, about 50-500 Hz, then it was seen that radio stations and other potential interference sources having band widths greater than 500 Hz tend to operate so as to considerably reduce the sensitivity of "fourth law" type detectors. Fourth law detectors are detectors whose output signal-noise ratio is proportional to the 4th power of the input signal-noise ratio.

Due to this limitation, practical frequency hopping (FH) detection schemes have often used channelizers which break up the frequency spectrum into smaller-sized band widths and allow the operator to keep track of narrow band interference sources. These methods relay on the high, instantaneous signal-to-noise ratio in the occupied channel for the detection capability. It should be noted, however, that channelizers suffer from a lack of efficient, automatic detection algorithms. Thus, it was considered useful to develop a hybrid detector which would include both channelizing circuitry and automatic feature detection circuitry which would still retain the advantage of each of these two systems.

Frequency hop radio transmissions create processing gain by utilizing a large number of independent hop frequency locations, for example, the Jaguar radio manufactured by Racal-Tactkom, Ltd. Berkshire, England, makes use of up to 2,000 different hop locations. It is generally seen that the input band width, W, of a frequency hop detector unit is much larger than the width of the binary phase shift keying envelop (BPSK).

Therefore, the BPSK modulation can be collapsed and the noise decorrelated by a delay-and-complex conjugate multiply stage in which the delay is set to approximately 1/W. This method is utilized by the type of hop rate detector known as the MODAC hop rate detector, shown in FIG. 2B. The MODAC was developed by Pacific Sierra Research located at Los Angeles, Calif.

The output signal of the MODAC hop rate detector is seen to be a random, complex, phase-shift keying signal (PSKS) with transitions occurring at the hop rate $1/T_h$ where $T_h$ = hop dwell time period. In this situation, the PSK signal-to-noise ratio is significantly improved by low pass filtering near the hop rate, and a spectral line (at the hop rate) is generated by another delay-and-complete conjugate multiply stage in which the delay is set to approximately $T_h/2$.

In the AC hop rate detector, shown in FIG. 2A, and in the AC radiometer, shown in FIG. 3, the input band is divided into two "half bands", and the BPSK modulation is collapsed by "magnitude squaring". The outputs of the squaring devices are then subtracted to form a bipolar signal fed to a difference amplifier. The difference amplifier is AC-coupled (eliminating the DC) to the second stage of the detector because of a direct current (DC), a term generated by the magnitude squaring of the noise involved with the information signal.

The input signal hops randomly between the two half bands, and thus the first stage output signal is a random, "direct sequence" (DS) wave form with transitions occurring at the hop rate. As with the MODAC detector, the direct sequence (DS) signal-to-noise ratio is significantly improved by low-pass filtering (LPF) near the hop rate.

The AC radiometer (FIG. 3) collapses the direct sequence (DS) signal by squaring, and then utilizes an integrator or low-pass filter for detection. The AC hop rate detector (of FIG. 2) generates a spectral line at the hop rate with use of a delay-and-mix circuit.

Up until the first low-pass filter, the AC hop rate detector and the AC radiometer are identical. However, the AC hop rate detector delay-and-mixer (FIG. 2A) generates a square wave with one-half the input signal amplitude, and thus, one-fourth the signal power. The power in the fundamental of the square wave is further reduced by a factor of $4/\pi^2$.

It follows that the AC radiometer (FIG. 3) output signal-to-noise ratio is approximately 9 dB greater than that of the AC hop rate detector (FIG. 2A).

Additionally, analysis has been made to indicate that, for low-input signal-to-noise ratio the AC hop rate detector (FIG. 2A) outperforms the MODAC hop rate detector (FIG. 2B) by the amount of 3 dB.

Thus, spectral analysis techniques, it may be understood, will not always reveal the "presence" of hybrid FH/DS (frequency hopping/direct sequence) signals because of the inherent covert nature of these signals. However, the class of fourth law detectors (such as the MODAC) has been shown to be useful when used with all types of frequency hopped signals.

For example, the simplified AC radiometer (FIG. 3) generates a DC level when frequency hopped (FH) signals are "present", thus reducing the signal present-/signal absent decision to a comparison with a set threshold. In addition to "signal presence" the "hop rate" can be determined with both the AC hop rate detector (FIG. 2A) and the MODAC hop rate detector (FIG. 2B). Each of these detectors generates a spectral line at the hop rate, which can be detected and characterized by ordinary spectral analysis techniques.

Another class of detectors which has been shown to be useful against frequency hopped signals are those which utilized "channeling" techniques. At any given point in time, the hybrid FH/DS signal is present in one channel only, thus providing a much higher instantaneous signal-to-noise ratio which can be exploited by various methods.

Radiometers have been utilized extensively for the purpose of detecting various spread-spectrum signal types, but generally suffer in the presence of narrow-band interference sources. Further channelizers have been utilized where narrow-band interference signal operations is a problem, as it normally is with frequency hopped nets. However, the channelizers suffer from a lack of efficient detection algorithms. Thus, in cluttered frequency bands, in which frequency hopped communication networks operate, it is essentially desireable to have a detector which has considerable immunity to narrow-band (NB) signal interference.

Thus, it is an object of the present invention to provide "a signal presence detector" for modulated or unmodulated frequency hopped (FH) signals, and which helps to provide considerable immunity to narrow-band interference sources.

SUMMARY OF THE INVENTION

There is provided herein a frequency hopped (FH) signal detector which combines channelizing techniques with radiometric techniques in order to determine "signal presence" for either modulated or unmodulated frequency hop signals while providing for high levels of immunity to narrow-band interference, making it much more useful in cluttered frequency bands where the frequency hopped communication networks often operate.

The received frequency hopped input signal is divided into L adjacent frequency bands by a channelizer or filter bank. Each channel has its own magnitude squaring circuit which generates a power estimate. Each power estimate is compared to a preset threshold level by individual channelized threshold detectors which produce a "1" voltage level if the threshold is exceeded, and produce an output "0" otherwise.

These voltage levels are summed or else subtracted depending on which half of the input band the corresponding channel lies in, since the reception frequencies are broken into an upper half set of channels and a lower half set of channels.

This summation and subtraction is generally accomplished by a differential amplifier and the resulting signal, which is AC-coupled to a radiometer, consists of the noise component and a direct sequence (DS) signal component. The DS signal component is present only if a frequency hopped signal (information signal) is present in the input signal, and thus, signal presence is determined by comparison with a threshold.

For example, one preferred embodiment consists of 16 channels of which eight channels form the upper half band of frequencies and eight channels form a set of lower band of frequencies. The channelization is accomplished by using 16 evenly spaced line oscillators (LO's) followed by band pass filters (BPF) all operating at the same intermediate frequency (IF). A threshold comparator performs the one-bit quantization for each channel.

The upper half set of channels are summed in a first summing circuit while the lower half of the set of channels are summed in a second summing circuit whereby both summing circuits feed into a differential amplifier. The signal output from the differential amplifier is AC-coupled to a low-pass filter, then to a power-squaring unit and a second low-pass filter, providing an output which is then compared to a threshold to determine signal presence.

BRIEF DESCRIPTION OF THE DRAWINGS

FIG. 1 is a block diagram of a preferred embodiment of the channelized binary-level radiometer;

DESCRIPTION OF PREFERRED EMBODIMENT

Figure 2A:
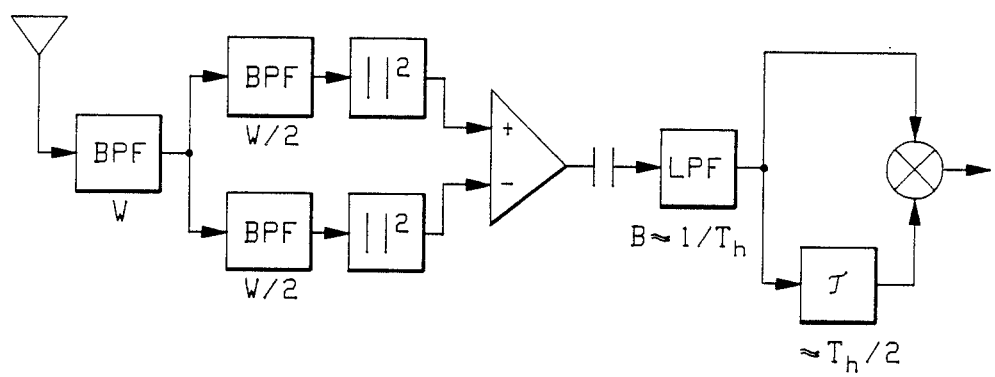
FIG. 2A is a block diagram of circuitry for a AC hop rate detector used in reception of frequency hopping transmissions.
Figure 2B:
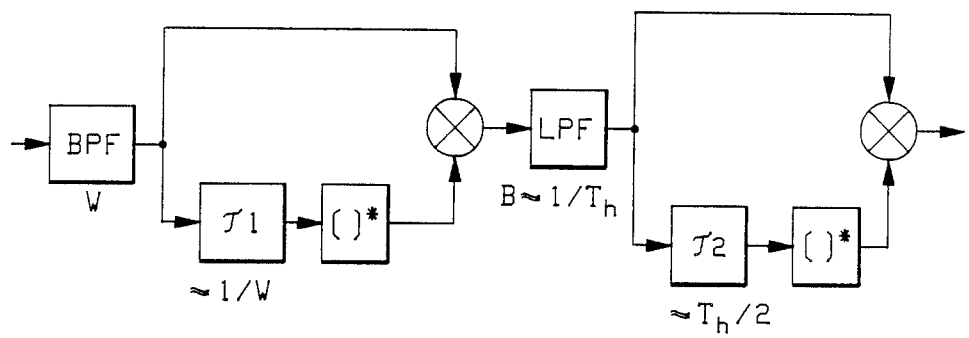
FIG. 2B is a block diagram of a MODAC hop rate detector used in reception of frequency hopping transmissions.
Figure 3:
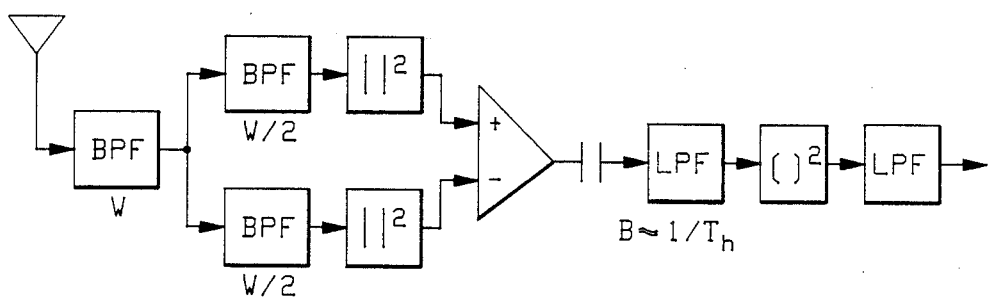
FIG. 3 is a simplified block diagram of an AC radiometer using only two channels for accomplishing signal detection of frequency hop signals.

As seen in FIG. 1, the incoming signals are received on input line 10 and fed to a series of band pass filters 12.

The channelization is accomplished by using, for example, 16 evenly spaced local oscillators followed by band pass filters (BPF) all operating at the same intermediate frequency. Thus, the incoming signals are separated into different channels according to their frequency characteristic. The input signal 10, being a frequency hopped signal, will, of course, have many variations of different frequency bands. As seen in FIG. 1, a first group of band pass filters is designated $B_u$ to indicate representation of an upper band group of channels while a second group of band pass filters is indicated as $B_d$ which represent a second or lower group of channels for passing various bands of frequency signals.

In FIG. 1, the band pass filters are designated as $12_a$, $12_b$ through $12_i$ which in the preferred embodiment would represent the first group of eight channels. Then the band pass filters $12_j$ through $12_n$ represent the channels involving the second or lower group ($B_d$) which cover a lower range of frequencies.

The symbol "L" is used to indicate that the input signal is divided into L adjacent frequency bands by the channelizer filter banks. Subsequently for each channel, there is a set of magnitude squaring circuits 14 which generate a power estimate for each individual channel. Each of these magnitude squaring circuits are designated $14_a$ through $14_i$ for the upper set of bands $B_u$ and designated as $14_j$ through $14_n$ for the lower set of bands $B_d$.

Following each one of the magnitude squaring circuits 14 there, is provided a "threshold detector" designated $15_a$ to $15_n$ involving a preset threshold voltage which will produce a "1" voltage level if the threshold is exceeded, and a "0" level if the threshold is not exceeded.

The output of each of the first group of threshold detectors 15 are fed to a first summation circuit $16_{h1}$. Likewise, the outputs of the second group of threshold circuits $15_j$ through $15_n$ are fed to a second summation circuit $16_{h2}$.

A differential amplifier 18 receives the outputs from the summation circuit $16_{h1}$ and from $16_{h2}$ in order to "add" those from $16_{h1}$ and "subtract" those from $16_{h2}$. The resulting signal is AC-coupled, via capacitor $18_c$, to a low pass filter 20. This signal consists of a direct sequence (DS) signal component and a noise component.

The direct sequence (DS) signal will be present only if a frequency hopped (FH) signal is "present" in the input signal, and thus, the "signal presence" will be determined by comparison with a preset threshold level which will overcome and eliminate the noise factor.

The preferred embodiment of FIG. 1 is made to consist of 16 channels of which eight are in the upper group $B_u$ and eight are in the lower group $B_d$.

The low pass filter 20 of FIG. 1 receives the direct sequence and noise signal and is operated with a band pass of approximately $1/T_h$ where $T_h$ is the hop dwell time and B represents the pass band frequencies.

The output of the low pass filter 20 is fed to a magnitude squaring circuit 32 and then feeds it to a low pass filter 34 which has an output signal 40.

The output signal 40 varies according to the threshold level $V_x$ placed in the low pass filter 34 such that if the incoming signal to the low pass filter 34 is above the threshold voltage $V_x$, then the output 40 will signify a voltage indicative of "presence" of a frequency hopped signal while, on the other hand, if the input signal to low pass filter 34 is below the threshold voltage $V_x$, then no voltage output is visible on output line 40 which thus indicates that there is no (absence of) frequency hopped signal at that time.

The above configuration is designated to work for reception of and detection of the "presence of" frequency hop signals which operate at a "constant" hop rate which is the normally used type of frequency hopped transmission. An example of this would be a transmission where the frequency changed at a hop rate of 250 times per second.

In the field of information transmission which uses various spread spectrum signal types, various types of radiometers have been utilized to detect "presence" of the signal, but these have suffered because of interference by narrow band sources. Channelizers have been utilized in certain cases where narrow band interference has been a problem, but they still suffer from reliability of efficiently providing detection algorithms for signal presence detection.

The present configuration combines the reliable quality and strengths of the channelizer features with that of power squaring and filtering techniques to provide a single, hybrid detector-type for signal presence detection. With the use of threshold detectors, there has not only been an improvement in performance, but considerably more immunity to narrow band interference sources.

Thus, there has been provided a channelized binary-level radiometer for detection of "signal presence" for either modulated or unmodulated frequency hopping signals which provide considerable immunity to narrow band interference. These are extremely useful in the cluttered frequency bands in which frequency hopping communication networks operate. The final output of the described channelized radiometer is a DC-level voltage signal which can be compared to a preset threshold which will signify whether a signal is present or a signal is absent.

While a preferred embodiment of the previously described channelized binary-level radiometer has been described in it functional and circuitry implementation, it is to be understood that the concepts involved may be possible in other circuit implementations, and are to be considered as defined by the following claims:

What is claimed is:

1. A detector for sensing the presence of a frequency-hopped signal comprising in combination:
   (a) means for channelizing a frequency-hopped input signal into a plurality of channels having separate and individual frequency bands;
   (b) amplification-quantization means, connected in each channel for detecting the power level of the frequency signals present in that band and quantizing said power level to a binary signal;
   (c) first connection means for connecting the outputs of one-half of the channels into a first totalizing circuit means;
   (d) second connection means for connecting the second half of said channels into a second totalizing circuit means;
   (e) combining means for subtracting the totalized output of said second totalizing means from the output of said first totalizing means;
   (f) means for providing a DC output voltage which indicates the presence of a frequency-hopped signal being transmitted.

2. The detector of claim 1 wherein said means for channelizing includes:
   (2a1) a plurality of band pass filters wherein each filter passes a sub-band W/L of frequencies where L is the number of sub-bands and W is the total band width utilized; said band pass filters providing separate signal channels which are divided into an upper group and a lower group of channels.

3. The detector of claim 1 wherein said amplification-quantization means includes:
   (3b2) squaring circuit means in each channel for multiplying the signal in that individual channel by itself to estimate the power value in each channel to provide an output to a first threshold detector unit;
   (3b2) quantization means which includes a plurality of threshold detectors wherein a threshold detector unit for each channel compares the signal in that channel to a present threshold voltage value, $V_x$, so that when the signal value exceeds $V_x$, a positive voltage is generated.

4. The detector of claim 1 wherein said first and second totalizing means respectively includes:
   (4c1) said first totalizing circuit means for adding together the signal outputs from said upper one-half of channels;
   (4d2) said second totalizing circuit means for adding together the signal outputs from said lower one-half of channels.

5. The detector of claim 1 wherein said combining means includes:
   (5e1) a differential amplifier for receiving the totalized added signal outputs from said first and second totalizing circuit means and for providing a first stage output signal representing the difference between said first and second totalized signal outputs.

6. The detector of claim 1 wherein said means for providing said DC output voltage, indicating the presence of the frequency hopped signal, includes:
   (6f1) a first low-pass filter having a band width B equal to $1/T_h$ where $T_h$ is the hop-dwell time period;
   (6f2) a power squaring circuit for multiplying the output of said first low-pass filter;
   (6f3) a second low-pass filter for filtering the output of said power squaring circuit to develop a discrete DC voltage output signifying the presence of, or a zero voltage signifying the absence of the frequency-hopped signal.

7. The combination of claim 1 wherein said means for providing a DC output voltage includes:

(a) a first low-pass filter means having a band width approximately equal to $1/T_h$ where $T_h$ represents the hop dwell period of the frequency-hopped input signal;

(b) a magnitude squaring circuit for power detecting the output of said first low pass filter means and providing an output to a second low pass filter means;

(c) said second low pass filter means for matching the DC output voltage signal from said magnitude squaring circuit in order to compare it against a second preset threshold to determine whether a frequency-hopped signal transmission is present rather than mere noise.

8. Apparatus for sensing presence/absence of a frequency-hopped signal comprising in combination:

(a) means for receiving a wide band of frequencies covering a transmitted frequency-hopped sequence of signals;

(b) means for channelizing said wide band into a plurality of sub-bands;

(c) means for squaring, in power magnitude, the output signals of each of said sub-bands;

(d) means for quantizing the varying signals of each sub-band in order to provide a binary level representation for each channel, wherein presence of the frequency-hopped signal produces a positive voltage output, and absence of the frequency-hopped signal produces a zero voltage output;

(e) means for connecting said channelizing means into an upper set of sub-bands and a lower set of sub-bands;

(f) means for totalizing the sum of the first group of sub-bands and the sum of the second group of sub-bands using first and second totalized sums;

(g) means for subtracting the said second totalized sum from the first totalized sum to provide a first stage output;

(h) means for conditioning the said first stage output of said totalizing means to provide a DC voltage output signal signifying the presence of a frequency-hopped input signal, or a zero output signifying absence of the frequency-hopped signal.

9. The apparatus of claim 8 wherein said means for channelizing includes:

(8b1) a plurality of L band-pass filters which span the utilized frequency band W and which function to apportion sub-bands of frequency into each of channels.

10. The method of detecting presence/absence of a frequency-hopped information signal comprising the steps of:

(a) channelizing a utilized wide band of frequency-hopped signals into a series of L sub-bands of channels;

(b) estimating the power level of the signals in each channel;

(c) quantizing the signal in each channel to generate a binary level if the signal value exceeds a preset threshold value, $V_x$.

(d) organizing said channels into a first group of upper channels and a second group of lower channels;

(e) adding the signal outputs of said first group of channels to form a first total;

(f) adding the signal outputs of said second group of channels to form a second total;

(g) subtracting said second total from said first total to generate a first stage output;

(h) modifying said first stage output to indicate the presence/absence of a frequency-hopped signal.

11. A detector for sensing the presence of a frequency-hopped signal comprising in combination:

(a) means for sorting said frequency-hopped signal through a plurality of channels having separate ranges of frequency bands;

(b) means for detecting the power level of the sub-signal in each channel and quantifying it to a binary level signal to generate a channel output signal;

(c) means for totalizing said channel output signals of the upper half of said channels to generate a first totalized sum;

(d) means for totalizing said channel output signals of the lower half of said channels to generate a second totalized sum;

(e) means for deriving a final output signal, from said first and second totalized sums, which indicates the presence or absence of said frequency-hopped signal.

* * * * *